United States Patent [19]
Jeuffray et al.

[11] Patent Number: 4,753,039
[45] Date of Patent: Jun. 28, 1988

[54] SYSTEM FOR GUIDING A SWINGING-SLIDING PANEL IN PARTICULAR FOR A VEHICLE DOOR

[75] Inventors: Jean-Marie Jeuffray; Bernard Laville, both of Bressuire, France

[73] Assignee: Etablissements Farnier et Penin, Courbevoie, France

[21] Appl. No.: 9,499

[22] Filed: Feb. 2, 1987

[30] Foreign Application Priority Data

Feb. 7, 1986 [FR] France ................ 86 01689

[51] Int. Cl.$^4$ ............................................. E05D 15/10
[52] U.S. Cl. ........................................ 49/213; 49/228; 49/426
[58] Field of Search ............... 49/213, 425, 426, 427, 49/224, 228

[56] References Cited

U.S. PATENT DOCUMENTS

| 1,928,523 | 9/1923 | Bally | 49/213 |
| 2,964,808 | 12/1960 | Kloess | 49/213 |
| 3,312,015 | 4/1967 | Plegat | 49/213 |

FOREIGN PATENT DOCUMENTS

| 2614809 | 10/1977 | Fed. Rep. of Germany | 49/425 |
| 3018700 | 11/1981 | Fed. Rep. of Germany | 49/213 |
| 0791063 | 2/1958 | United Kingdom | 49/426 |
| 1352046 | 5/1974 | United Kingdom | 49/213 |

Primary Examiner—Kenneth J. Dorner
Assistant Examiner—Gerald A. Anderson
Attorney, Agent, or Firm—Murray and Whisenhunt

[57] ABSTRACT

The invention relates to a wrap-over swinging-sliding door (2) which swings into a closure position at the end of its closure stroke. The door is guided relative to the vehicle bodywork by a bottom rail (4) which co-operates with wheels (3a) fixed to the panel and by at least one top rail (7a, 7b) which is situated at roof level and which co-operates with a horizontal wheel (6a, 6b) which is guided therein and which is capable of moving vertically when the bottom wheels engage a swing-imparting slope which lowers the door at the same time as it moves the door into the bodywork.

6 Claims, 3 Drawing Sheets

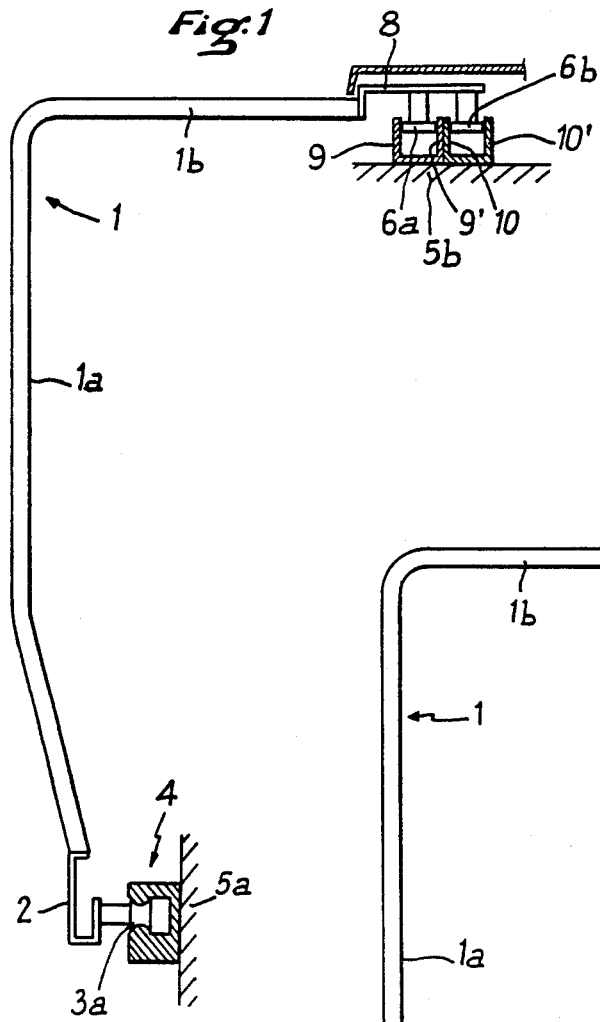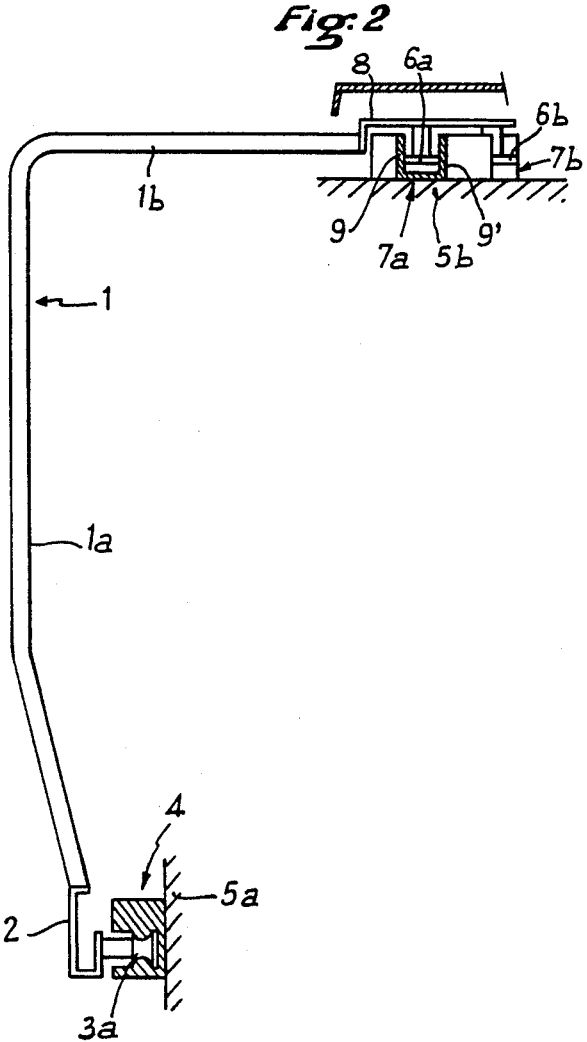

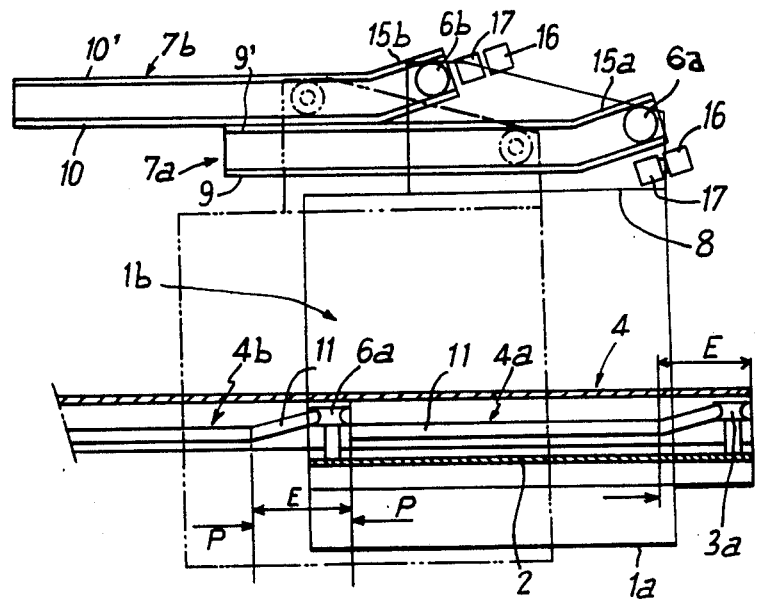
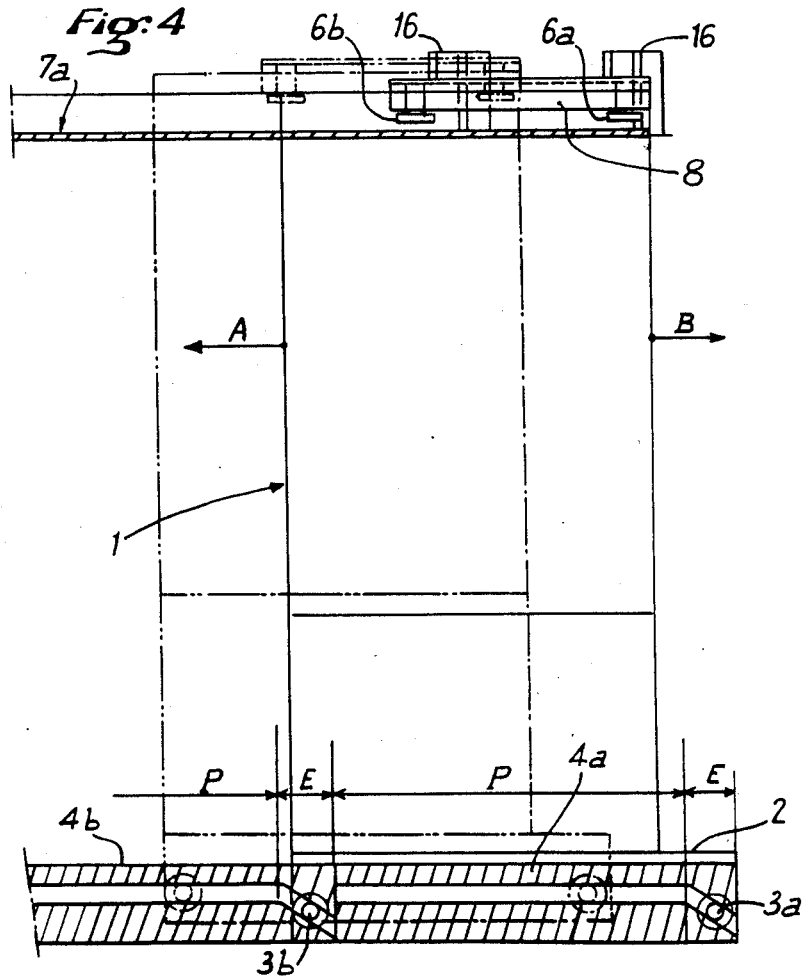

SYSTEM FOR GUIDING A SWINGING-SLIDING PANEL IN PARTICULAR FOR A VEHICLE DOOR

A swinging-sliding door is a sliding door which closes and opens an opening through a fixed structure by sliding substantially parallel to said structure, with the added feature that the end of the closure stroke and the beginning of the opening stroke of the door includes a movement component into or away from the opening, for example to enable the closed door to be flush with the wall or fixed structure having the opening which is closed by the door. This movement, whereby a sliding door is moved into, rather than just over the opening it closes is advantageous in that it provides better contact between the door and the door sill or frame when the door is closed, thus providing better sealing against water and air.

BACKGROUND OF THE INVENTION

The guides used for imparting such a path on the door thus include a curved end portion directed towards the side of the vehicle bodywork (supposing that said fixed structure is constituted by a vehicle body). Wheels associated with the door and co-operating with said guides must therefore be provided with a certain degree of freedom relative to the guides in order to be capable of running therealong without excessive friction or other drawbacks in the curved portions. Such wheels are therefore provided with floating or oscillating mounts on the moving door panel, thereby providing a connection between the door panel and the structure via said guides and wheels which is not very rigid. As a result the door may vibrate, thereby giving rise to wear and to noise.

The present invention seeks to provide a solution to guiding a swinging-sliding panel whereby the panel is firmly held to the stucture over its entire path relative to the structure, and whereby the same quality of swinging motion can be obtained for a wrap-over door panel, i.e. a panel having a top portion that curves over to lie generally horizontally, e.g. flush with the roof or top of the vehicle body in addition to a generally vertical portion which comes generally flush with the side of the vehicle body when the door is closed. Wrap-over doors of this type move into their closure position with a complex motion having two perpendicular horizontal components and a vertical component in order to bring the above-mentioned top portion of the door down into the same general plane as the roof of the vehicle bodywork.

SUMMARY OF THE INVENTION

The present invention provides a guidance system for a swinging-sliding panel, e.g. a door panel for a public transport vehicle, the motion of said panel being principally constituted by a sliding motion, and having a swinging motion at the end of its closure stroke and at the beginning of its opening stroke, the panel comprising a vertical portion parallel to the vertical wall of the vehicle bodywork and a top portion extending parallel to the roof or top wall of said vehicle bodywork and projecting inwardly relative to the vehicle bodywork from the top of said vertical portion, said guidance system being constituted by at least one guidance rail running along the bottom portion of the bodywork wall and at least one guidance rail running along the top portion of said bodywork, together with two bottom wheels fixed to the bottom portion of the panel and co-operating with said bottom rail, and a top wheel fixed to the top portion of said panel and co-operating with said top rail, the system including the improvement whereby the bottom rail is constituted by two generally coaxial portions placed one after the other, with each of said portions having a single corresponding one of said bottom wheels running therealong, each of said rails having a running surface comprising a horizontal rectilinear part and an end part which is directed downwardly and inwardly towards the vehicle bodywork, while the top rail is constituted by a horizontal guide path on the roof of the bodywork and delimited by two vertical edges which are parallel to each other and to the horizontal projection of one or other of said portions of the bottom rail, said edges being of a height which is not less than the above-specified vertical drop of the end part of the running surface.

Preferably, the bottom wheels are grooved wheels mounted to rotate about fixed axes extending perpendicularly to the vertical portion of the panel, and wherein the corresponding bottom rail has a profile in its rectilinear part which corresponds to the profile of the groove and has a profile in its end part which is of variable and tapering right cross-section.

The above-specified variable right cross-section may be generated by a profile having the same cross-section as the groove of the wheel being displaced parallel to itself along a line corresponding to the desired swinging path for the panel.

In addition, each portion of the bottom rail includes an upper backing rail co-operating with the corresponding wheel with a suitable degree of play, and disposed to one side of the plane defined by the vertical portion of the panel which is integrally formed with the rectilinear portion of the corresponding rail and which is constituted by a top piece applied opposite to the end portion.

Finally, the top wheel is mounted to rotate about a fixed axis which is fixed to the portion of the panel extending parallel to the bodywork roof, said axis extending parallel to said vertical edges, and the diameter of said wheel being no greater than the width of the guide path delimited by the two edges.

BRIEF DESCRIPTION OF THE DRAWINGS

An embodiment of the invention is described by way of example with reference to the accompanying drawings, in which:

FIG. 1 is a diagrammatic section view through a door panel which is guided in accordance with the invention and which is shown in an intermediate position on its guide rails;

FIG. 2 is a similar view to FIG. 1, except that the door panel is shown in its closed position;

FIG. 3 is a diagrammatic plan view of the door panel and its guide rails;

FIG. 4 is a diagrammatic side view of the panel and its guide rails;

MORE DETAILED DESCRIPTION

Figure 5:
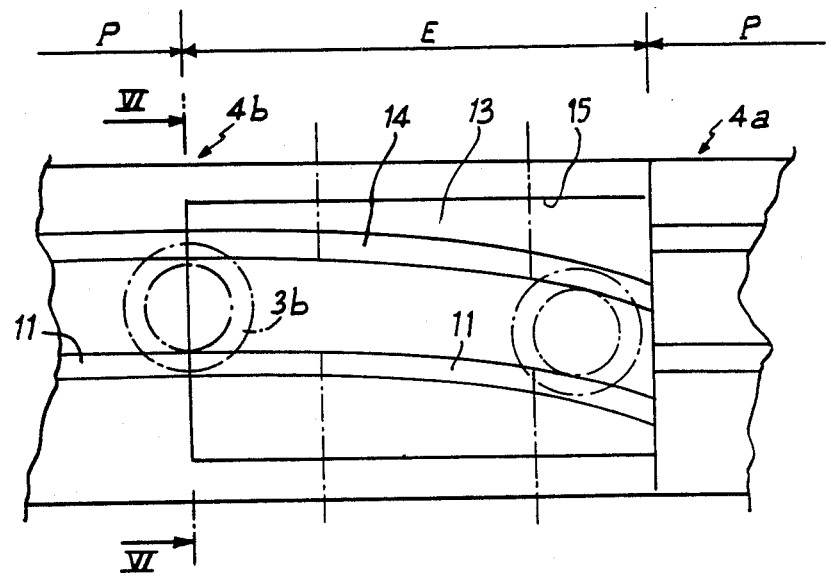
FIG. 5 is a side view showing an end portion of one of the bottom rails to a larger scale.

Reference is made initially to the first four figures which show a panel 1 constituting the moving panel of a door for a vehicle (not shown), said door panel having a substantially vertical portion 1a and a top portion 1b extending generally horizontally from the top of the vertical portion 1a. The bottom of the door panel 1 is fitted with a support 2 which is connected to a conventional motorized drive system (not shown) suitable for causing the door panel to move in either of two opposite directions A and B (see FIG. 4) in order respectively to open and to close an opening through the vehicle bodywork.

The door panel is guided as it moves along the side of a vehicle by bottom wheels 3a and 3b mounted to rotate about respective axes perpendicular to the side of the vehicle and fixed to the support 2. These bottom wheels are suitable for running along a rail 4 which extends parallel to the side of the vehicle and which is fixed to a structural element 5a of the vehicle located near the bottom of its bodywork. The wheels 3a and 3b are weight-supporting wheels which support the weight of the panel 1. At the top of the panel, guidance is provided by means of wheels 6a and 6b running in guide paths 7a and 7b. The wheels 6a and 6b are mounted to rotate about substantially vertical shafts mounted on a support plate 8 which is itself fixed to the top portion 1b of the panel 1, and which extends said top portion. The guide paths 7a and 7b are constituted by pairs of vertical edges 9 and 9' for the path 7a and 10 and 10' for the path 7b, with said edges being constituted, for example, by the flanges of respective channel section bars which are fixed to a horizontal structural member 5b forming a part of the roof of the vehicle bodywork. The gaps between the edges 9 and 9' or 10 and 10' of the guide paths are slightly greater than the diameters of the wheels 6a and 6b which serve to hold the door panel relative to the structure solely in a direction perpendicular to the above-specified displacement directions A and B. The height or depth of the edges is sufficient to allow for vertical movement of the wheels 6a and 6b without them escaping from the guide paths. In a variant of the embodiment shown, the support 8 could be fitted with only one wheel, and the bodywork roof structure element 5b would then support only one guide path.

For each door panel, the corresponding rail 4 is constituted by two identical portions 4a and 4b extending one after the other along the displacement directions A and B. Each of these portions has a single corresponding one of the two wheels 3a and 3b running therealong and the length of each portion is equal to the horizontal distance between said two wheels. Each portion 4a and 4b is divided into two parts, namely a substantially rectilinear main part P whose running section is shown in FIG. 7, and an end part E which is seen end-on in FIG. 6 and sideways-on in FIG. 5.

Figure 6:
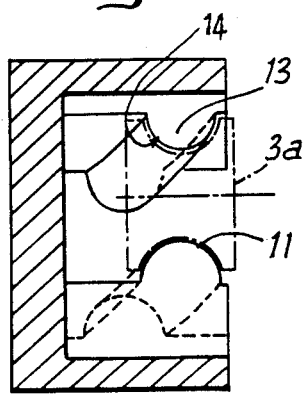
FIG. 6 is a cross-section on line VI—VI of FIG. 5.
Figure 7:
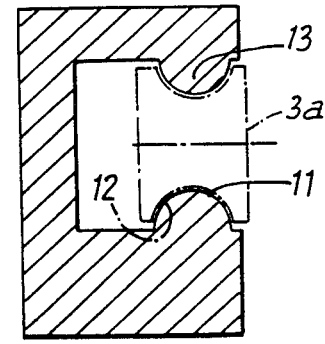
FIG. 7 is a cross-section of the running portion of the bottom rail.

It can be seen in FIGS. 5 to 7 that each rail portion 4a and 4b has a bottom running surface or rail 11 whose profile matches the profile of the groove 12 in the corresponding grooved wheel 3a or 3b, at least along the main part P thereof. Above this surface 11, there is another rail or backing rail 13 having a bottom surface 14 which also penetrates into the groove 12, while leaving enough play to allow the wheel to rotate, thereby constituting retaining means to prevent the wheel from escaping from the rail by vertical movement. In said main part P, the rail and the backing rail are integrally formed (see FIG. 7). However, in the end part E, the rail and the backing rail are made in two distinct portions which are disposed facing each other in a housing 15 provided for this purpose in the bar in which the running portion of the main rail part P is formed.

It can be seen in FIGS. 5 and 6 that in the end part E, the rail and the backing rail follow a downwardly directed curve which also moves inwardly towards the vertical structural element to which the rail is attached. FIG. 3 shows the horizontal projection of this curve while FIG. 4 is a diagrammatic projection thereof onto a vertical plane. Thus, when the wheels 3a and 3b reach the end zone E of their respective rail portions 4a and 4b by running in direction B, their trajectories go downwardly and inwardly towards the vehicle bodywork, thereby bringing the door panel 1 down and in against the sill of the opening which it is to close. It should be observed, that although the wheels 3a and 3b remain parallel to themselves during this displacement, their axes of rotation are no longer perpendicular to the axis of the horizontal projection of the surface 11 on which they run. In order to prevent the wheels from jamming, the profiles of the surface 11 and of the backing rail (but to a lesser extent because of the operating play) are not constant along the slope. These profiles are tapered in order to prevent the sides of the groove 12 from rubbing. These variable profiles are obtained by a cutter having a groove similar to the grooves in the wheels, and which is moved, during machining, with a motion identical to the path desired for the wheel. This special machining of parts of the rail and the backing rail in the above-specified end zone explains why add-on parts are used, and has the advantage of eliminating any degree of freedom in oscillation for the axis of rotation of the corresponding wheel relative to the panel. This rigid connection between the wheels and the panel provides very good guidance for the door and avoids most of the door vibrations which would otherwise occur.

The top of the door panel 1 is likewise guided by guide paths 7a and 7b which are disposed in two parts: a rectilinear part parallel to the main part P of the bottom rail; and an end part 15a or 15b running parallel to the horizontal projection of the path defined by the end part E of the corresponding bottom rail. When the wheels 3a and 3b run along the end zones E of their corresponding rails, the wheels 6a and 6b are guided horizontally in the end parts 15a and 15b of the rails 7a and 7b so as to hold the door panel 1 parallel to itself, while the wheels 6a and 6b move downwardly between the pairs of edges 9, 9', and 10, 10', from the high position shown in FIG. 1 to the low position shown in FIG. 2.

At the end of the closure movement, with the wheels 3a and 3b maintained at the bottoms of the slopes in the end zones E of the bottom rails, the top portion of the panel is held in place by co-operation between fixed abutments 16 and moving abutments 17 that move with the panel, said abutments having respective corresponding male and female surfaces for providing centered panel retention for the top portion of the panel relative to the bodywork of the vehicle.

The invention is particularly applicable to constructing accessories for public transport vehicles.

We claim:

1. A guidance system for a swinging-sliding door panel for a public transportation vehicle, said panel comprising a vertical portion having a top and a bottom and extending parallel to a vertical wall of a vehicle body work and a top portion extending parallel to a roof of said vehicle bodywork and projecting inwardly relative to said vehicle bodywork, said vehicle bodywork having a top and a bottom, said system comprising:

a bottom rail running along said bottom of said bodywork, said bottom rail including two generally aligned portions placed one after the other, with each said portion having a convex running surface comprising a horizontal rectilinear part and an end part having a free end, said end part being directed downwardly and inwardly towards said vehicle bodywork;

two bottom grooved wheels pivoted about a pivot axis on said bottom of said panel, said two bottom grooved wheels running respectively on each of said portions of said bottom rail, said rectilinear parts having a profile corresponding substantially to the profile of the groove of said bottom groove wheels as well as the profile of said end part in a transverse plane section comprising said pivot axis of said wheels;

at least one top rail having an end and running along said roof, said top rail including a horizontal guide path on said roof having a width delimited by two vertical edges which are parallel to each other and to a horizontal projection of one of said portions of said bottom rail, said vertical edges being of a height which is not less than the vertical distance between said horizontal part of said bottom rail and said free end of said end part of said bottom rail.

2. A system according to claim 1, wherein each portion of said bottom rail includes an upper backing rail cooperating with the corresponding wheel which is mounted on a pivot perpendicular to said vertical portion of said panel.

3. A system according to claim 2, wherein said backing rail is integrally formed with the rectilinear part of the corresponding rail, and the end part of said rail is constituted by an add-on part disposed opposite said end part of the rail which is itself also constituted by an add-on part.

4. A system according to claim 1, wherein a top wheel is mounted to rotate about a fixed axis which is fixed to said top portion of said panel extending parallel to said bodywork roof, said axis extending parallel to said vertical edges of said wheel having a diameter no greater than said width of said guide path delimited by said two edges.

5. A system according to claim 4, including two top guide paths for two respective wheels fixed to said top portion of said panel.

6. A system according to claim 1, including an abutment and panel-centering member disposed at said end of said top rail, said member cooperating with a member of complementary shape mounted on said panel when said panel reaches the free end of said rail.

* * * * *